(12) United States Patent
Murata et al.

(10) Patent No.: US 9,770,961 B2
(45) Date of Patent: Sep. 26, 2017

(54) INTERMITTENT OPERATION OF BATTERY TEMPERATURE CONTROL SYSTEM

(71) Applicants: Takashi Murata, Kasugai (JP); Yasumitsu Omi, Okazaki (JP); Takashi Yamanaka, Kariya (JP); Masayuki Takeuchi, Aichi-ken (JP)

(72) Inventors: Takashi Murata, Kasugai (JP); Yasumitsu Omi, Okazaki (JP); Takashi Yamanaka, Kariya (JP); Masayuki Takeuchi, Aichi-ken (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 14/767,792

(22) PCT Filed: Feb. 11, 2014

(86) PCT No.: PCT/IB2014/000246
§ 371 (c)(1),
(2) Date: Aug. 13, 2015

(87) PCT Pub. No.: WO2014/125370
PCT Pub. Date: Aug. 21, 2014

(65) Prior Publication Data
US 2016/0031289 A1 Feb. 4, 2016

(30) Foreign Application Priority Data
Feb. 14, 2013 (JP) .................. 2013-026214

(51) Int. Cl.
*B60L 9/00* (2006.01)
*B60H 1/00* (2006.01)
(Continued)

(52) U.S. Cl.
CPC ...... *B60H 1/00278* (2013.01); *B60L 11/1874* (2013.01); *H01M 10/633* (2015.04);
(Continued)

(58) Field of Classification Search
CPC ............ B60H 1/00278; H01M 10/633; B60L 11/1874
See application file for complete search history.

(56) References Cited

U.S. PATENT DOCUMENTS 5,490,572 A * 2/1996 Tajiri ................. B60H 1/00278
180/65.1
2002/0195288 A1* 12/2002 Komiyama .............. B60K 6/46
180/65.245
2012/0280050 A1* 11/2012 Tonozuka ........... B60L 11/1861
236/94

FOREIGN PATENT DOCUMENTS

JP 63-145705 U 9/1988
JP 05-344606 A 12/1993
(Continued)

*Primary Examiner* — Adam Alharbi
(74) *Attorney, Agent, or Firm* — Sughrue Mion, PLLC

(57) ABSTRACT

A temperature control system includes an on-vehicle battery, on-vehicle air conditioner, and a controller. The on-vehicle battery is charged using an external power supply located outside of the vehicle. The on-vehicle air conditioner controls the temperature of the vehicle interior and the temperature of the on-vehicle battery. The controller operates the on-vehicle air conditioner in an intermittent operation mode so as to control the temperature of the on-vehicle battery, when the on-vehicle battery is charged using the external power supply.

8 Claims, 7 Drawing Sheets

(51) Int. Cl.
  *B60L 11/18* (2006.01)
  *H01M 10/633* (2014.01)
  *H01M 10/663* (2014.01)
  *H01M 10/625* (2014.01)

(52) U.S. Cl.
  CPC . *H01M 10/663* (2015.04); *B60H 2001/00307* (2013.01); *H01M 10/625* (2015.04); *Y02T 10/705* (2013.01); *Y02T 10/7005* (2013.01)

(56) References Cited

FOREIGN PATENT DOCUMENTS

| | | |
|---|---|---|
| JP | 2002-027612 A | 1/2002 |
| JP | 2008-024124 A | 2/2008 |

\* cited by examiner

INTERMITTENT OPERATION OF BATTERY TEMPERATURE CONTROL SYSTEM

BACKGROUND OF THE INVENTION

1. Field of the Invention

The invention relates to a temperature control system.

2. Description of Related Art

As known characteristics of a battery, the internal resistance increases and input and output characteristics deteriorate as the temperature decreases, and degradation of the battery speeds up as the temperature increases.

A cooling system for a battery for use in an automobile is disclosed in Japanese Utility Model Application Publication No. 63-145705 (JP 63-145705 U). The cooling system includes an evaporator that cools the vehicle interior, a condenser that cools a heat exchange medium delivered to the evaporator, and a compressor that pressurizes a cooling medium delivered to the condenser. The cooling system is characterized in that a battery case contains a battery mounted in an engine room, the battery case is formed with an outside-air introduction duct, a heat exchanger is housed in the battery case, and the heat exchanger is connected to a heat exchange medium passage that connects the evaporator for cooling the vehicle interior with the compressor.

In recent years, electric vehicles (EV) and plug-in hybrid vehicles (PHV) capable of charging an on-vehicle battery using a power supply provided outside of the vehicle (which will be called "external power supply") are of particular interest. This type of charging will be called "external charging".

SUMMARY OF THE INVENTION

In the above type of vehicle, the battery needs to be cooled during external charging. However, if the battery is cooled using the on-vehicle air conditioner as described above, the service life of the on-vehicle air conditioner may be shortened due to increase of the operating time. Namely, the compressor included in the on-vehicle air conditioner is normally designed in terms of the service life, based on the operating time during running of the vehicle; therefore, if the on-vehicle air conditioner is continuously used during external charging, the compressor reaches the end of its service life in a significantly shorter time than expected.

Also, when the ambient temperature is an extremely low temperature, the battery temperature after external charging is too low, and desired input and output characteristics may not be obtained. In this case, it is necessary to operate the on-vehicle air conditioner so as to elevate the temperature of the battery during external charging; however, the compressor reaches the end of its service life in a significantly shorter time than expected, as in the case where the battery needs to be cooled.

The invention provides a temperature control system that controls the temperature of an on-vehicle battery during external charging, using an on-vehicle air conditioner, without causing significant reduction of the service life of the on-vehicle air conditioner.

A temperature control system for a vehicle according to the invention includes an on-vehicle battery, an on-vehicle air conditioner, and a controller. The on-vehicle battery is charged using an external power supply located outside of the vehicle. The on-vehicle air conditioner controls a temperature of a vehicle interior and a temperature of the on-vehicle battery. The controller operates the on-vehicle air conditioner in an intermittent operation mode so as to control the temperature of the on-vehicle battery, when the on-vehicle battery is charged using the external power supply.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of the invention will be described.

Figure 1:
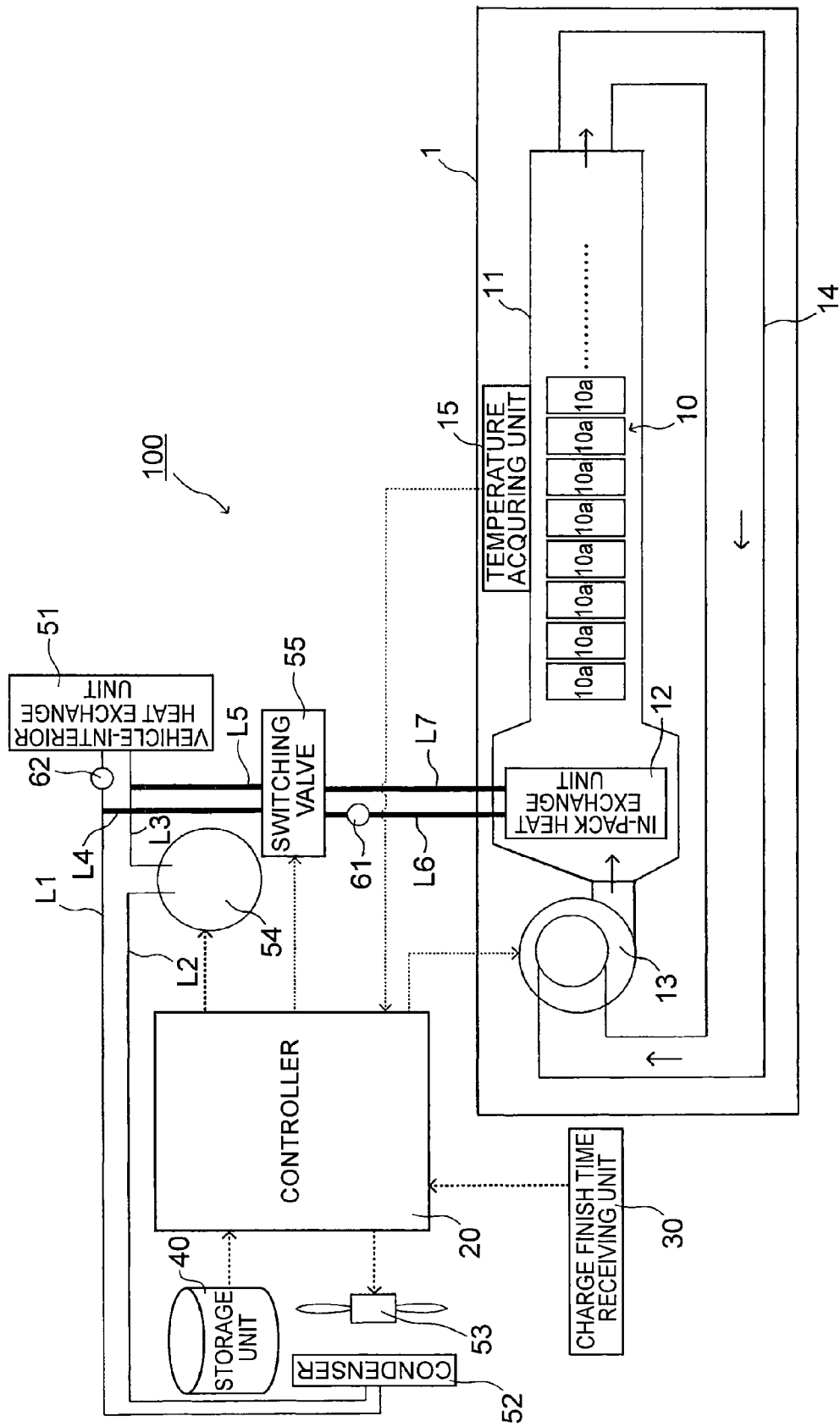
FIG. 1 is a schematic view showing the configuration of a temperature control system.

A temperature control system for an on-vehicle battery (which will be simply called "temperature control system") as one embodiment of the invention will be described with reference to FIG. 1. FIG. 1 schematically illustrates the configuration of the temperature control system. The temperature control system 100 includes a battery pack 1, a vehicle-interior heat exchange unit 51, a condenser 52, a fan 53, a compressor 54, a switching valve 55, heat-exchange-medium transfer pathways L1-L7, a first pressure control unit 61, a second pressure control unit 62, a controller 20, a charge finish time receiving unit 30, and a storage unit 40.

The battery pack 1 includes a battery assembly (corresponding to the on-vehicle battery) 10, a chamber 11, an in-pack heat exchange unit 12, a blower 13, a circulation pathway 14, and a temperature acquiring unit 15. The battery assembly 10 consists of cells 10a that are connected in series. However, some of the cells 10a included in the battery assembly 10 may be connected in parallel with each other. Secondary batteries, such as lithium-ion batteries or nickel-metal-hydride batteries, may be used as the cells 10a. Also, electric double layer capacitors may be used in place of the secondary batteries. The number of the cells 10a that constitute the battery assembly 10 may be set as appropriate, in view of the power required of the battery assembly 10.

The battery assembly 10 supplies electric power to a motor for running the vehicle. The vehicle may be a hybrid vehicle or an electric vehicle. The hybrid vehicle includes the battery assembly 10, and another power source, such as an engine or a fuel cell, as power sources for running the vehicle. The electric vehicle includes only the battery assembly 10, as a power source for running the vehicle. The chamber 11 is mounted to the battery assembly 10, and forms an in-pack transfer passage for air used for controlling the temperature of the battery assembly 10.

The blower 13 is driven using electric power of the battery assembly 10, and is operable to send air into the chamber 11. The in-pack heat exchange unit 12 is disposed between the battery assembly 10 and the blower 13. The air delivered from the blower 13, when it passes through the in-pack heat exchange unit 12, exchanges heat with a heat exchange medium drawn into the in-pack heat exchange unit 12, for control of the temperature of the air. When the air delivered from the blower 13 is cooled by the heat exchange medium, the battery assembly 10 can be cooled by use of the air thus cooled. When the air delivered from the blower 13 is heated by the heat exchange medium, the battery assembly 10 can be warmed up by use of the air thus heated.

The circulation pathway 14 is a pathway through which the air delivered from the blower 13 into the chamber 11 circulates inside and outside of the chamber 11. The temperature acquiring unit 15 acquires temperature information of the battery assembly 10. A thermistor may be used as the temperature acquiring unit 15. The thermistor may be provided on each of the cells 10a, or may be provided on each of battery blocks into which two or more of the cells 10a are grouped. The temperature information obtained by the temperature acquiring unit 15 is transmitted to the controller 20.

The controller 20, which governs control of the temperature control system 100 as a whole, controls driving of the fan 53, compressor 54, switching valve 55, and the blower 13, and controls charge/discharge of the battery assembly 10. The controller 20 may be one ECU, or two or more ECUs. For example, an ECU that performs temperature control on the vehicle interior may be different from an ECU that performs temperature control on the battery assembly 10.

The compressor 54 includes a drive unit provided by an electric motor, and a spiral scroll unit that performs inhalation, compression, and discharge of the heat exchange medium. The compressor 54 is driven using electric power of the battery assembly 10. The switching valve 55 switches the transfer pathway of the heat exchange medium between a pathway that leads to the vehicle-interior heat exchange unit 51, and a pathway that leads to the in-pack heat exchange unit 12.

When the vehicle interior is to be cooled, a heat exchange medium in the form of a gas is compressed into a high-temperature, high-pressure gas in the compressor 54, and then discharged into the heat-exchange-medium transfer pathway L2. The heat exchange medium discharged into the heat-exchange-medium transfer pathway L2 flows into the condenser 52, and is cooled by air from the fan 53. The heat exchange medium cooled at the condenser 52 is discharged into the heat-exchange-medium transfer pathway L1, and the pressure of the heat exchange medium is reduced while it is passing through the second pressure control unit 62, so that the heat exchange medium is further cooled. The heat exchange medium, whose pressure has been reduced while it is passing through the second pressure control unit 62, flows into the vehicle-interior heat exchange unit 51, and cools air delivered into the vehicle interior. The heat exchange medium, whose temperature has been raised after cooling the air delivered into the vehicle interior, is discharged into the heat-exchange-medium transfer pathway L3, and flows into the compressor 54 again.

When the battery assembly 10 is to be cooled, a heat exchange medium in the form of a gas is compressed into a high-temperature, high-pressure gas in the compressor 54, and then discharged into the heat-exchange-medium transfer pathway L2. The heat exchange medium discharged into the heat-exchange-medium transfer pathway L2 flows into the condenser 52, and is cooled by air from the fan 53. The heat exchange medium cooled at the condenser 52 is discharged into the heat-exchange-medium transfer pathway L1, and flows into the heat-exchange-medium transfer pathway L4 at a position ahead of the second pressure control unit 62. The heat exchange medium flowing into the heat-exchange-medium transfer pathway L4 passes through the switching valve 55, and flows into the heat-exchange-medium transfer pathway L6. The heat exchange medium flowing into the heat-exchange-medium transfer pathway L6 has its pressure reduced while it is passing through the first pressure control unit 61, so as to be further cooled. The heat exchange medium, whose pressure has been reduced while passing through the first pressure control unit 61, flows into the in-pack heat exchange unit 12, and cools air sent from the blower 13. The heat exchange medium, whose temperature has been raised by cooling the air from the blower 13, is discharged from the in-pack heat exchange unit 12 into the heat-exchange-medium transfer pathway L7, and flows into the compressor 54 again, through the switching valve 55, heat-exchange-medium transfer pathway L5, and the heat-exchange-medium transfer pathway L3.

When the vehicle interior is to be warmed, a heat exchange medium in the form of a gas is compressed into a high-temperature, high-pressure gas in the compressor 54, and then discharged into the heat-exchange-medium transfer pathway L3. The heat exchange medium discharged into the heat-exchange-medium transfer pathway L3 flows into the vehicle-interior heat exchange unit 51, and raises the temperature of air sent into the vehicle interior. The heat exchange medium, which has been cooled by raising the temperature of the air sent into the vehicle interior, is discharged into the heat-exchange-medium transfer pathway L1, and has its pressure reduced while passing through the second pressure control unit 62, so as to be further cooled. The heat exchange medium, whose pressure has been reduced while passing through the second pressure control unit 62, flows into the condenser 52, and is heated by air sent from the fan 53. The heat exchange medium heated at the condenser 52 is discharged into the heat-exchange-medium transfer pathway L2, and flows into the compressor 54 again.

When the temperature of the battery assembly 10 is to be elevated, a heat exchange medium in the form of a gas is compressed into a high-temperature, high-pressure gas in the compressor 54, and then discharged into the heat-exchange-medium transfer pathway L3. The heat exchange medium discharged into the heat-exchange-medium transfer pathway L3 flows into the heat-exchange-medium transfer pathway L5, at a position ahead of the vehicle-interior heat exchange unit 51. The heat exchange medium flowing into the heat-exchange-medium transfer pathway L5 passes through the switching valve 55 and the heat-exchange-medium transfer pathway L7, and flows into the in-pack heat exchange unit 12. The heat exchange medium flowing into the in-pack heat exchange unit 12 warms air sent from the blower 13. The heat exchange medium, which has been cooled by warming the air from the blower 13, is discharged into the heat-exchange-medium transfer pathway L6, and has its pressure reduced while passing through the first pressure control unit 61, so as to be further cooled. The heat exchange medium, whose pressure has been reduced in the first pressure control unit 61, flows into the condenser 52, via the switching valve 55, heat-exchange-medium transfer pathway L4, and the heat-exchange-medium transfer pathway L1, and is heated by air sent from the fan 53. The heat exchange medium heated in the condenser 52 is discharged into the heat-exchange-medium transfer pathway L2, and flows into the compressor 54 again.

The storage unit 40 stores processing programs of processing performed by the controller 20, and various types of information needed for executing the processing programs. The various types of information includes the heat capacity C [J/K] of the battery assembly 10, target cooling temperature K1 [K] used when cooling the battery assembly 10, target elevated temperature K1' [K] used when warming the battery assembly 10, temperature control efficiency A [%] of the battery assembly 10, minimum start-up time T3 [sec] during a cooling operation of the temperature control system 100, minimum start-up time T3' [sec] during a heating operation of the temperature control system 100, power P [W] of the temperature control system 100 when cooling the battery assembly 10, power P' [W] of the temperature control system 100 when warming the battery assembly 10, etc.

The heat capacity C [J/K] of the battery assembly 10 may be the sum of heat capacities of the respective cells 10a. The target cooling temperature K1 [K] may be set to an appropriate value with the objective of curbing deterioration of the battery assembly 10. The target elevated temperature K1' [K] may be set to an appropriate value with the objective of improving input and output characteristics of the battery assembly 10. The temperature control efficiency A [%] may be set to an appropriate value, by checking the quantity of heat naturally released from the battery assembly 10 by experiment, or simulation. The temperature control efficiency A [%] is set to the same value in the case where the battery assembly 10 is cooled and the case where the battery assembly 10 is warmed. The minimum start-up time T3 is a period of time from the time when the compressor 54 is activated to the time when the temperature of the in-pack heat exchange unit 12 is stabilized. For example, a thermistor (not shown) may be provided in the in-pack heat exchange unit 12, and the minimum start-up time T3 may be set to a length of time it takes until the amount of change of the temperature detected by the thermistor per unit time becomes equal to 0 (including an error). The definition of the minimum start-up time T3' is the same as that of the minimum start-up time T3, and therefore, will not be explained again. The power P and the power P' may be the sum of the powers of the blower 13, fan 53, and the compressor 54, for example. Also, the power P and the power P' may be determined as appropriate according to the performance of the temperature control system 100, and may be different numerical values, or the same numerical value.

Figure 2:
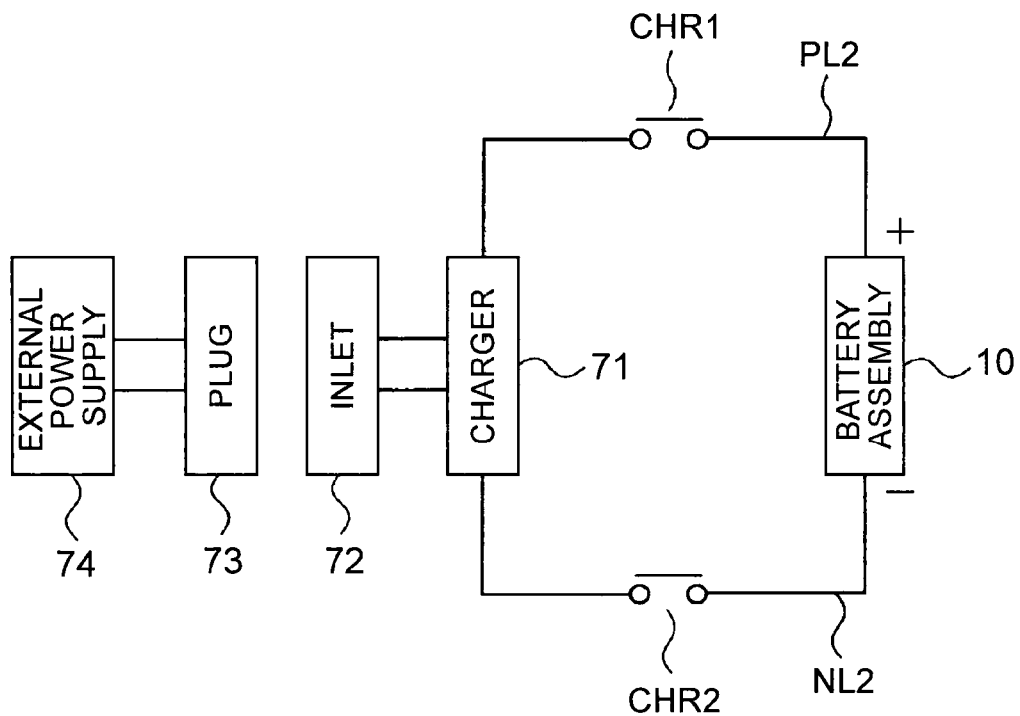
FIG. 2 is a view showing the configuration of an external charging system.

Referring next to FIG. 2, an external charging system for externally charging the battery assembly 10 will be described. A positive line PL2 is connected to a positive terminal of the battery assembly 10. A negative line NL2 is connected to a negative terminal of the battery assembly 10.

A charge relay CHR1 is provided in the positive line PL2. A charge relay CHR2 is provided in the negative line NL2. The charge relays CHR1, CHR2 are switched between ON and OFF, in response to a control signal from the controller 20 shown in FIG. 1.

A charger 71 is connected to the battery assembly 10, via lines PL2, NL2. The charger 71 converts AC power supplied from an external power supply 74 (which will be described later), into DC power, and supplies the DC power to the battery assembly 10. In this manner, the battery assembly 10 can be charged with electric power from the external power supply 74. When the electric power is supplied from the external power supply 74 to the battery assembly 10, the charger 71 can convert the voltage, too.

An inlet 72 is connected to the charger 71. The inlet 72 is connected to a plug 73. In this example, the charger 71 and the inlet 72 are installed on the vehicle. The plug 73 is located outside of the vehicle. The plug 73 is connected to the external power supply 74. By connecting the plug 73 to the inlet 72, it is possible to supply electric power from the external power supply 74 to the charger 71.

The external power supply 74 is a power supply installed separately from the vehicle, outside the vehicle. For example, a commercial power supply may be used as the external power supply. As the vehicle runs using the power of the battery assembly 10, the SOC (State of Charge) of the battery assembly 10 is reduced. Then, an external charging operation is performed so as to increase the SOC of the battery assembly 10. In this connection, the SOC is the ratio of the current charging capacity to the full charging capacity.

Figure 3:
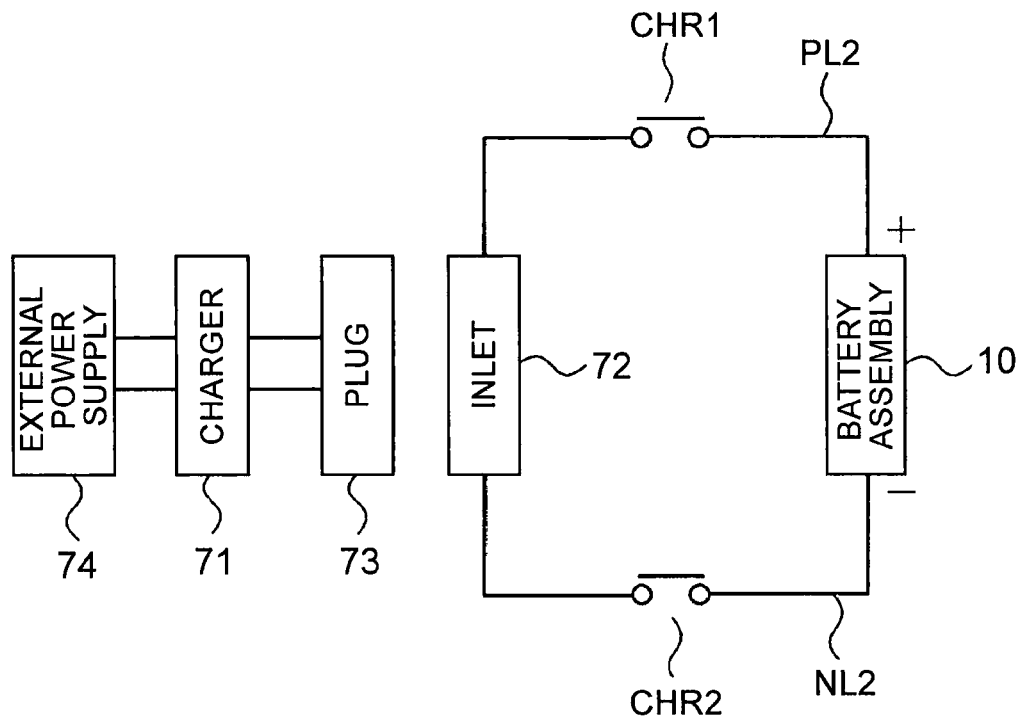
FIG. 3 is a view showing the configuration of another example of external charging system.

A system that performs an external charging operation is not limited to the system shown in FIG. 2. Namely, any other system may be employed provided that electric power of the external power supply 74 can be supplied to the battery assembly 10. More specifically, a system as shown in FIG. 3 may be used, in place of the system shown in FIG. 2. In FIG. 3, the same reference numerals are used to identify members having the same functions as the members explained above referring to FIG. 2.

The inlet 72 is connected to the battery assembly 10, via the positive line PL2 and the negative line NL2. In this example, the inlet 72 is installed on the vehicle. The plug 73 to be connected to the inlet 72 is connected to the charger 71, outside the vehicle. The charger 71 converts AC power supplied from the external power supply 74, into DC power. When the plug 73 is connected to the inlet 72, the DC power from the charger 71 is supplied to the battery assembly 10. In this manner, the battery assembly 10 can be charged.

In the system shown in FIG. 3, the controller 20 can start an external charging operation, or stop the external charging operation, by communicating with the charger 71. The communications between the controller 20 and the charger 71 may be performed wirelessly or by cable. The electric power of the external power supply 74 may be supplied wirelessly or by cable to the battery assembly 10. Namely, a so-called contactless charging method, utilizing electromagnetic induction or resonance phenomenon, may be employed.

Figure 4:
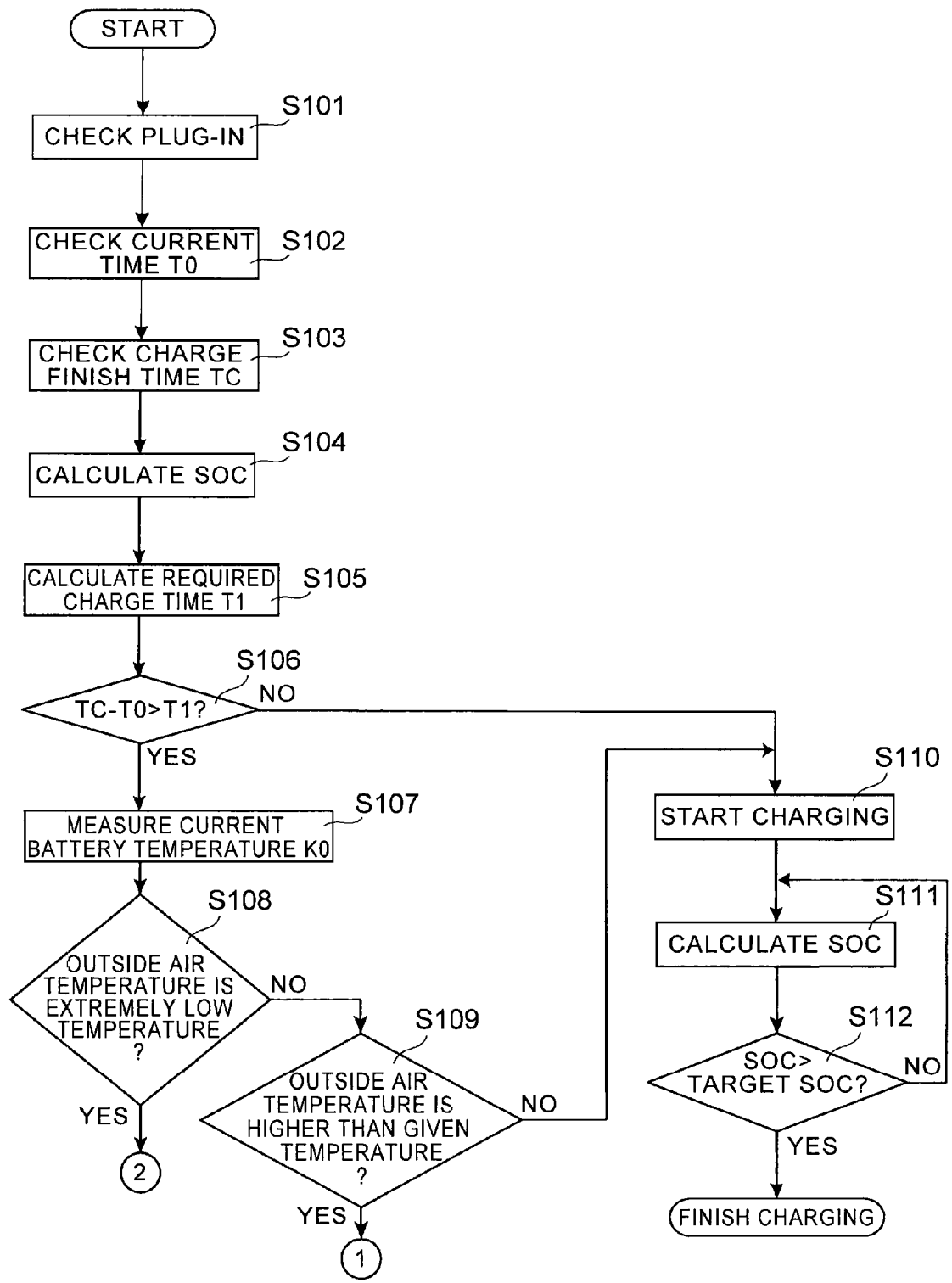
FIG. 4 is a flowchart illustrating the former half of a temperature control process executed during external charging.
Figure 5:
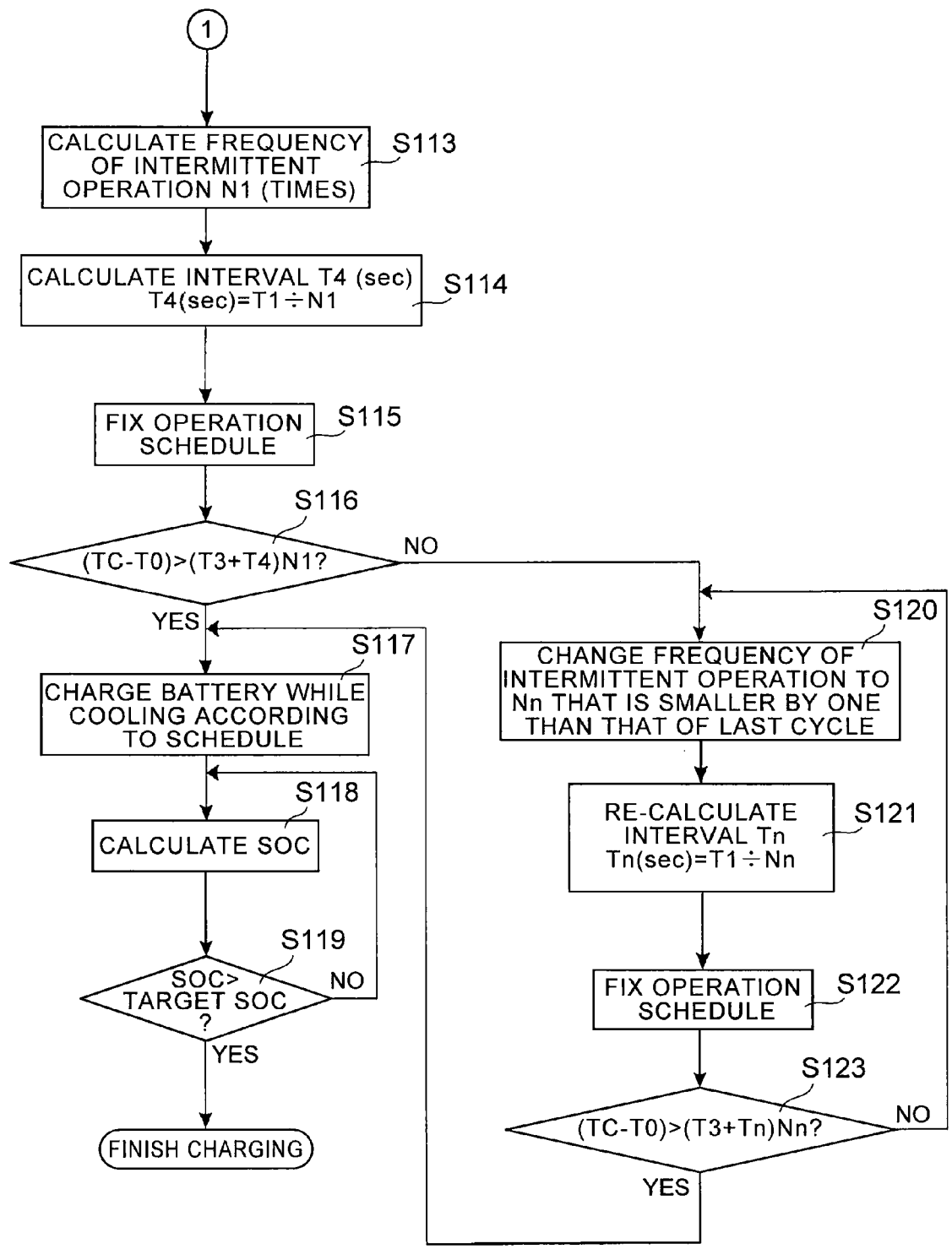
FIG. 5 is a flowchart illustrating the latter half of the temperature control process (cooling process) executed during external charging.

Referring next to the flowcharts of FIG. 4, FIG. 5 and FIG. 7, a temperature control process for the battery assembly 10, which is performed by the controller 20 during external charging, will be described. Referring to FIG. 4, when the plug 73 is connected to the inlet 72 (step S101), the controller 20 checks the current time T0, and stores it in the storage unit 40 (step S102). After checking the current time T0, the controller 20 stores the charge finish time TC entered via the charge finish time receiving unit 30, in the storage unit 40 (step S103). The charge finish time may be entered by the user.

The controller 20 calculates the current SOC of the battery assembly 10 (step S104), and calculates a period of time T1 [sec] required for charging, from a difference between a target SOC to be achieved after charging and the current SOC (step S105). Namely, the controller 20 calculates the required charge time T1 [sec] required to charge the battery assembly 10 to the target SOC. The target SOC may be set to an appropriate value with the objective of preventing overcharge.

The controller 20 calculates an available charge time from a difference between the charge finish time TC and the current time T0, and compares the length of the calculated available charge time (TC−T0) [sec] with that of the required charge time T1 [sec] (step S106). Namely, in step S106, the controller 20 determines whether the battery assembly 10 can be charged to the target SOC, within the available charge time (TC−T0) [sec]. When the battery assembly 10 cannot be charged to the target SOC (NO in step S106), the controller 20 starts charging the battery assembly 10, without executing the temperature control process for the battery assembly 10.

When the temperature of the battery assembly 10 is controlled, the fan 53, compressor 54, and the blower 13 need to be driven using electric power of the battery assembly 10; therefore, a part of electric power of the battery assembly 10 that is externally charged is consumed as energy for operating the compressor 54, etc. Thus, when it is determined that the battery assembly 10 cannot be charged to the target SOC (NO in step S106), charging of the battery assembly 10 is prioritized over temperature control of the battery assembly 10. As a result, the SOC of the battery assembly 10 can be made closer to the target SOC.

Once charging of the battery assembly 10 is started, the controller 20 calculates the SOC of the battery assembly 10 (step S111), and continues charging until the SOC of the battery assembly 10 reaches the target SOC (step S112).

If, on the other hand, the battery assembly 10 can be charged to the target SOC within the available charge time (TC−T0) [sec] (YES in step S106), the controller 20 detects the current temperature of the battery assembly 10, based on a detection result of the temperature acquiring unit 15, and stores the detected temperature as the current battery temperature K0 in the storage unit 40 (step S107). The controller 20 determines whether the outside air temperature is an extremely low temperature (step S108). The extremely low temperature may be set to an appropriate value with the objective of maintaining the input and output characteristics of the battery assembly 10. It may also be determined whether the outside air temperature is an extremely low temperature, based on the average temperature of a day detected by an outside air temperature sensor (not shown) of the vehicle. However, it may also be determined whether the outside air temperature is an extremely low temperature, by obtaining the average temperature of a day from a server via the Internet, rather than using the outside air temperature sensor.

If the outside air temperature is not an extremely low temperature (NO in step S108), the controller 20 determines whether the outside air temperature is higher than a given temperature (step S109). The given temperature may be set to an appropriate value with the objective of curbing deterioration of the battery assembly 10 due to a rise in temperature during charging. If the outside air temperature is not higher than the given temperature (NO in step S109), the battery assembly 10 does not deteriorate largely even if the battery assembly 10 is left generating heat due to external charging; therefore, the control proceeds to step S110. Namely, if the outside air temperature is not an extremely low temperature, nor is higher than the given temperature, the controller 20 performs external charging of the battery assembly 10, without operating the temperature control system 100. It is thus possible to eliminate a loss of electric power of the battery assembly 10, which loss is caused by operation of the temperature control system 100.

If, on the other hand, the outside air temperature is higher than the given temperature (YES in step S109), the battery assembly 10 needs to be cooled during external charging; therefore, the control proceeds to step S113. Referring next to FIG. 5, a process of step S113 and subsequent steps will be described. The process of step S113 and subsequent steps is performed by the controller 20 when the temperature control system 100 is operated in an intermittent operation mode. The intermittent operation mode mentioned herein is an operating mode in which an operating state in which the temperature control system 100 is activated or operated so as to control the temperature of the battery assembly 10, and an operation stopped state in which the temperature control system 100 is stopped, are repeated alternately.

The controller 20 calculates the frequency of intermittent operation N1 [times], namely, the frequency of operation of the temperature control system 100 during external charging (step S113). More specifically, the controller 20 initially calculates the amount of energy E [J] required for a cooling process on the battery assembly 10. The energy amount E [J] may be calculated according to Eq. (A) as indicated below. The controller 20 reads the heat capacity C [J/K] of the battery assembly 10, the target cooling temperature K1 [K] of the battery assembly 10, and the current battery temperature K0 [K] and temperature control efficiency A [%] of the battery assembly 10, from the storage unit 40, and performs arithmetic processing so as to calculate the energy amount E [J].

$$E=\{C\times(K0-K1)\times A\} \quad (A)$$

After calculating the energy amount E [J], the controller 20 calculates the total time T2 [sec] required for cooling, according to Eq. (B) as indicated below. Namely, the controller 20 reads the power P of the temperature control system 100 from the storage unit 40, and divides the energy amount E [J] by the power P, so as to calculate the total time T2 [sec] required for cooling.

$$T2=E\div P \quad (B)$$

After calculating the total time T2 [sec] required for cooling, the controller 20 calculates the frequency of intermittent operation N1 [times], according to Eq. (C) as indicated below. Namely, the controller 20 reads the minimum start-up time T3 of the temperature control system 100 from the storage unit 40, and divides the total time T2 [sec] required for cooling by the minimum start-up time T3, so as to calculate the frequency of intermittent operation N1 [times].

$$N1=T2\div T3 \quad (C)$$

It will be understood that that Equation (1) stated in claim 2 is obtained by substituting Eq. (A) and Eq. (B) into Eq. (C).

After calculating the frequency of intermittent operation N1 [times], the controller 20 divides the required charge time T1 [sec] by the frequency of intermittent operation N1 [times], so as to calculate an interval T4 [sec] (step S114). The interval T4 [sec] is a period of time from the time when the operation of the temperature control system 100 is stopped to the time when the operation is resumed.

The controller 20 fixes an operation schedule, and stores it in the storage unit 40 (step S115). More specifically, the controller 20 determines an intermittent operation mode in which the operating state in which the temperature control system 100 is operated for the minimum start-up time T3 [sec] and the operation stopped state in which the temperature control system 100 is stopped for the interval T4 [sec] are alternately repeated N1 times, as the operation schedule. The method of cooling the battery assembly 10 using the temperature control system 100 has been described above, and therefore, will not be repeated.

The controller 20 compares a period of execution time (T3+T4)N1 [sec] of intermittent operation determined in step S115, with the available charge time (TC−T0) [sec] (step S116). If the available charge time (TC−T0) [sec] is longer than the execution time (T3+T4)N1 [sec] of intermittent operation (YES in step S116), the intermittent operation can be carried out as scheduled within the available charge time (TC−T0) [sec]. Thus, the controller 20 intermittently operates the temperature control system 100 according to the fixed operation schedule, while externally charging the battery assembly 10 (step S117).

Figure 6:
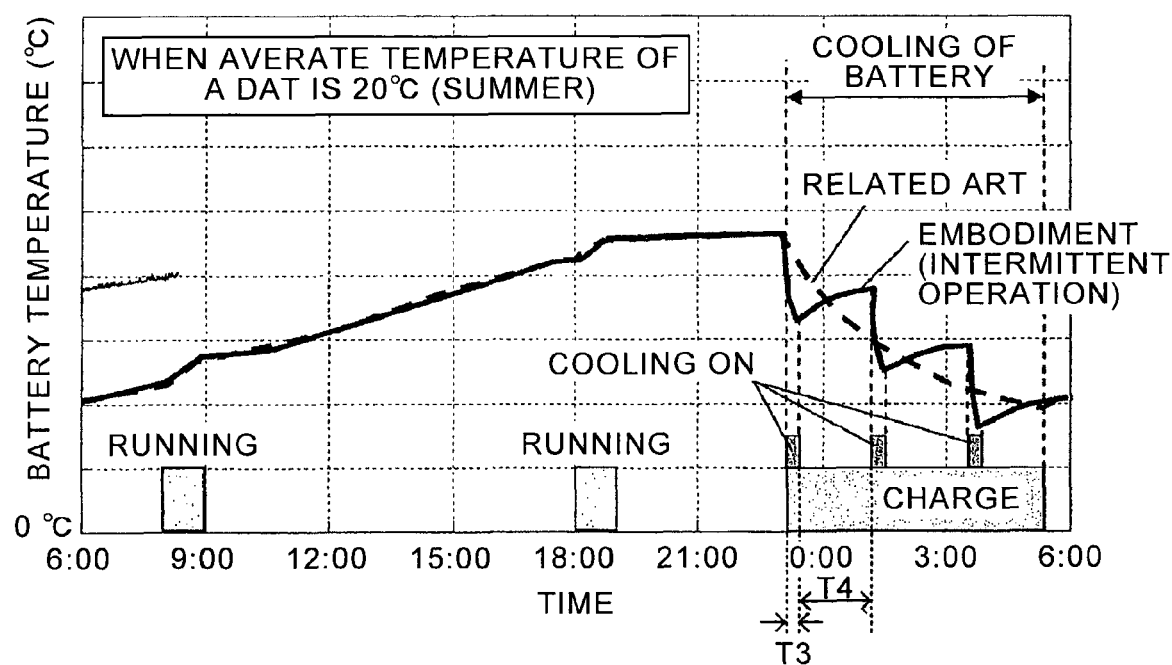
FIG. 6 is a graph indicating temperature changes during cooling of a battery assembly.

FIG. 6 shows changes in the temperature of the battery assembly 10, which varies from hour to hour. In FIG. 6, the horizontal axis indicates time, and the vertical axis indicates the temperature of the battery assembly 10. The dotted line indicates changes in the temperature of the battery assembly 10 in the case where the temperature control system 100 is continuously operated during external charging. The solid line indicates changes in the temperature of the battery assembly 10 in the case where the temperature control system 100 is intermittently operated during external charging. In the example of FIG. 6 in which the average temperature of a day was a relatively high temperature of 20° C., the process of cooling the battery assembly 10 while externally charging the same was carried out. Also, as a result of computation by the controller 20, the frequency of intermittent operation N1 [times] was calculated as three times. By comparing the solid line with the dotted line, it was found that the average temperature of the battery assembly 10 during external charging does not substantially differ between the case of continuous operation and the case of intermittent operation. In the case of intermittent operation, the temperature control system 100 is stopped at times corresponding to the intervals T4; therefore, the operating time of the compressor 54 is shortened, and the service life of the compressor 54 is less likely to be reduced, as compared with the case of continuous operation.

Referring to the flowchart of FIG. 5 again, the controller 20 calculates the SOC of the battery assembly 10, after starting external charge of the battery assembly 10 (step S118), and continues charging until the SOC of the battery assembly 10 reaches the target SOC (step S119).

When the available charge time (TC−T0) [sec] is shorter than the execution time (T3+T4)N1 [sec] of intermittent operation (NO in step S116), the scheduled intermittent operation cannot be completed within the available charge time (TC−T0) [sec], resulting in insufficient cooling of the battery assembly 10. Therefore, step S120 and subsequent steps are executed, so as to change the operation schedule. The controller 20 changes the frequency of intermittent operation N1 [times] to a new frequency of intermittent operation Nn [times] which is smaller by one than that of the last cycle (step S120). For example, when the frequency of intermittent operation N1 [times] of the last cycle is three times, the controller 20 set two times as the new frequency of intermittent operation Nn [times].

After calculating the frequency of intermittent operation Nn [times], the controller 20 divides the required charge time T1 [sec] by the frequency of intermittent operation Nn [times], so as to re-calculate a new interval Tn [sec] (step S121). The controller 20 fixes the operation schedule, and stores it in the storage unit 40, (step S122). More specifically, the controller 20 determines an intermittent operation mode in which the operating state in which the temperature control system 100 is operated only for the minimum start-up time T3 [sec] and the stopped state in which the temperature control system 100 is stopped only for the interval Tn [sec] are alternately repeated Nn times, as the operation schedule.

The controller 20 compares the execution time (T3+Tn)Nn [sec] of intermittent operation determined in step S122, with the available charge time (TC−T0) [sec] (step S123). If the available charge time (TC−T0) [sec] is longer than the execution time (T3+Tn)Nn [sec] of intermittent operation (YES in step S123), the scheduled intermittent operation can be completed within the available charge time (TC−T0) [sec]. In this case, the controller 20 intermittently operates the temperature control system 100, according to the fixed operation schedule, while externally charging the battery assembly 10. If the available charge time (TC−T0) [sec] is not longer than the execution time (T3+Tn)Nn [sec] of intermittent operation (NO in step S123), the control returns to step S120. Then, step S120 through step S123 are repeatedly executed, until the available charge time (TC−T0) [sec] becomes longer than the execution time (T3+Tn)Nn [sec] of intermittent operation.

According to the above-described method, the amount of energy required to cool the battery assembly 10 is calculated, and the battery assembly 10 can be cooled to an extent corresponding to this amount of energy within the available charge time (TC−T0) [sec]; therefore, the battery assembly 10 can be prevented from being insufficiently cooled. Consequently, deterioration of the battery assembly 10 due to the temperature rise thereof can be curbed with improved reliability.

Figure 7:
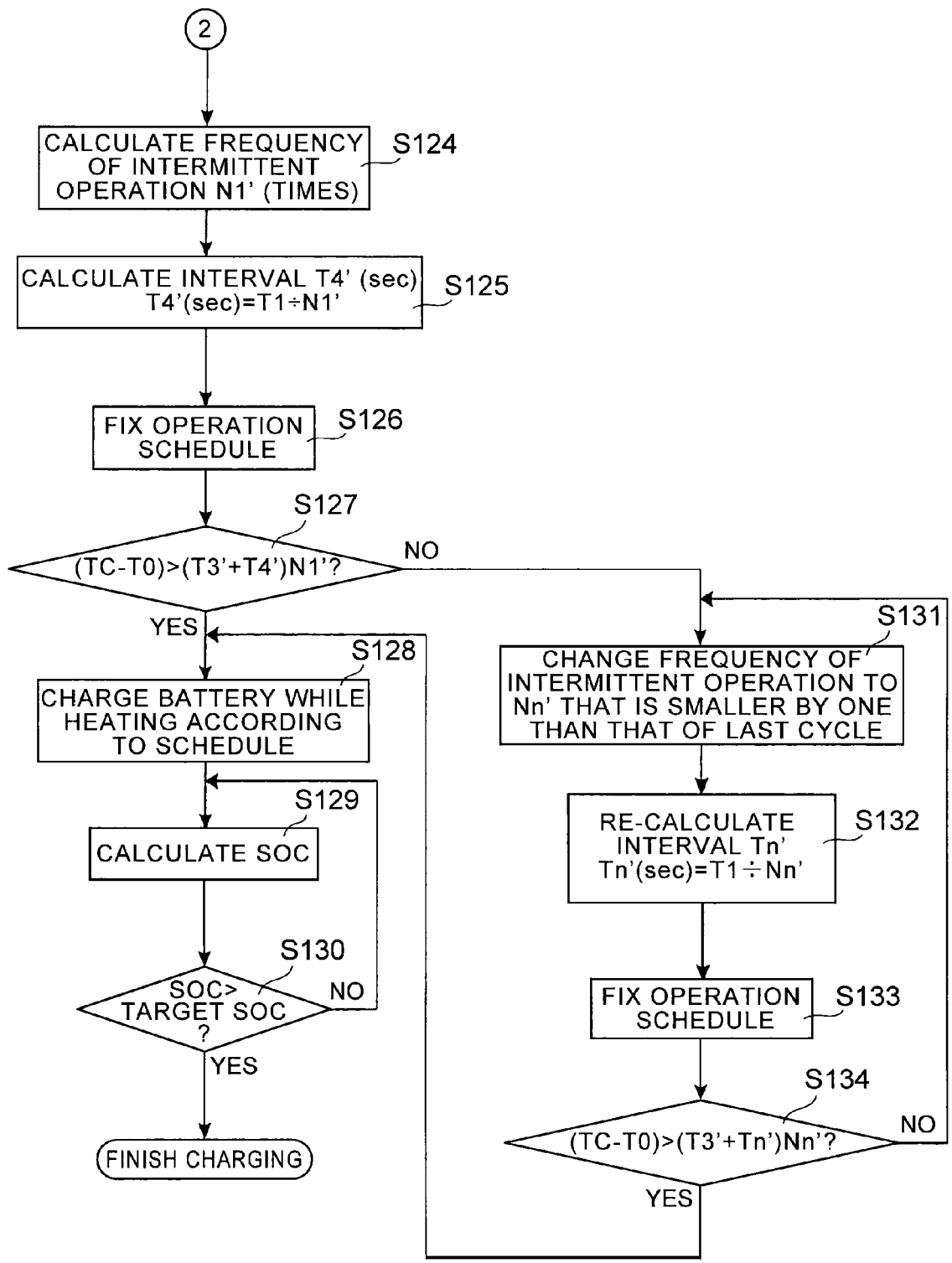
FIG. 7 is a flowchart illustrating the latter half of the temperature control process (warm-up process) executed during external charging.

Referring to FIG. 4 again, when the outside air temperature is an extremely low temperature (YES in step S108), the temperature of the battery assembly 10 needs to be elevated during external charging; therefore, the control proceeds to step S124 of FIG. 7. Referring next to FIG. 7, a process of step S124 and subsequent steps will be described. The controller 20 performs the process of step S124 and subsequent steps when it intermittently operates the temperature control system 100. The definition of the intermittent operation will not be repeatedly described.

The controller 20 calculates the frequency of intermittent operation N1' [times], namely, the frequency of operation of the temperature control system 100 during external charging (step S124). More specifically, the controller 20 initially calculates the amount E' [J] of energy required for the process of elevating the temperature of the battery assembly 10. The energy amount E' [J] may be calculated according to Eq. (A)' as indicated below. The controller 20 reads the heat capacity C [J/K] of the battery assembly 10, the target elevated temperature K1' [K] of the battery assembly 10, and the current battery temperature K0' [K] and temperature control efficiency A of the battery assembly 10, from the storage unit 40, and performs arithmetic processing, so as to calculate the energy amount E' [J].

$$E'=\{C \times (K1'-K0') \times A\} \tag{A}'$$

After calculating the energy amount E' [J], the controller 20 calculates the total time T2' [sec] required for elevating the temperature of the battery assembly 10, according to Eq. (B)' as indicated below. Namely, the controller 20 reads the power P' of the temperature control system 100 from the storage unit 40, and divides the energy amount E' [J] by the power P', so as to calculate the total time T2' [sec] required for elevating the battery temperature.

$$T2'=E' \div P' \tag{B}'$$

After calculating the total time T2' [sec] required for elevating the battery temperature, the controller 20 calculates the frequency of intermittent operation N1' [times] according to Eq. (C)' as indicated below. Namely, the controller 20 reads the minimum start-up time T3' of the temperature control system 100 from the storage unit 40, and divides the total time T2' [sec] required for elevating the battery temperature by the minimum start-up time T3', so as to calculate the frequency of intermittent operation N1' [times].

$$N1'=T2'\div T3' \quad (C)'$$

It will be understood that Equation (1)' stated in claim 7 is obtained by substituting Eq. (A)' and Eq. (B)' into Eq. (C)'.

After calculating the frequency of intermittent operation N1' [times], the controller 20 divides the required charge time T1 [sec] by the frequency of intermittent operation N1' [times], so as to calculate the interval T4' [sec] (step S125). The definition of the interval T4' [sec] will not be repeatedly described.

The controller 20 fixes the operation schedule, and stores it in the storage unit 40 (step S126). More specifically, the controller 20 determines the intermittent operation mode in which the operating state in which the temperature control system 100 is operated for the minimum start-up time T3' [sec], and the operation stopped state in which the temperature control system 100 is stopped for the interval T4' [sec], are alternately repeated N1' times, as the operation schedule. The method of elevating the temperature of the battery assembly 10 using the temperature control system 100 has been described above, and therefore, will not be repeatedly described.

The controller 20 compares the execution time (T3'+T4') N1' [sec] of intermittent operation determined in step S126, with the available charge time [TC−T0] [sec] (step S127). If the available charge time [TC−T0] [sec] is longer than the execution time (T3'+T4')N1' [sec] of intermittent operation (YES in step S127), the intermittent operation can be carried out according to the schedule, within the available charge time (TC−T0) [sec]. Thus, the controller 20 intermittently operates the temperature control system 100, according to the fixed operation schedule, while externally charging the battery assembly 10 (step S128).

Figure 8:
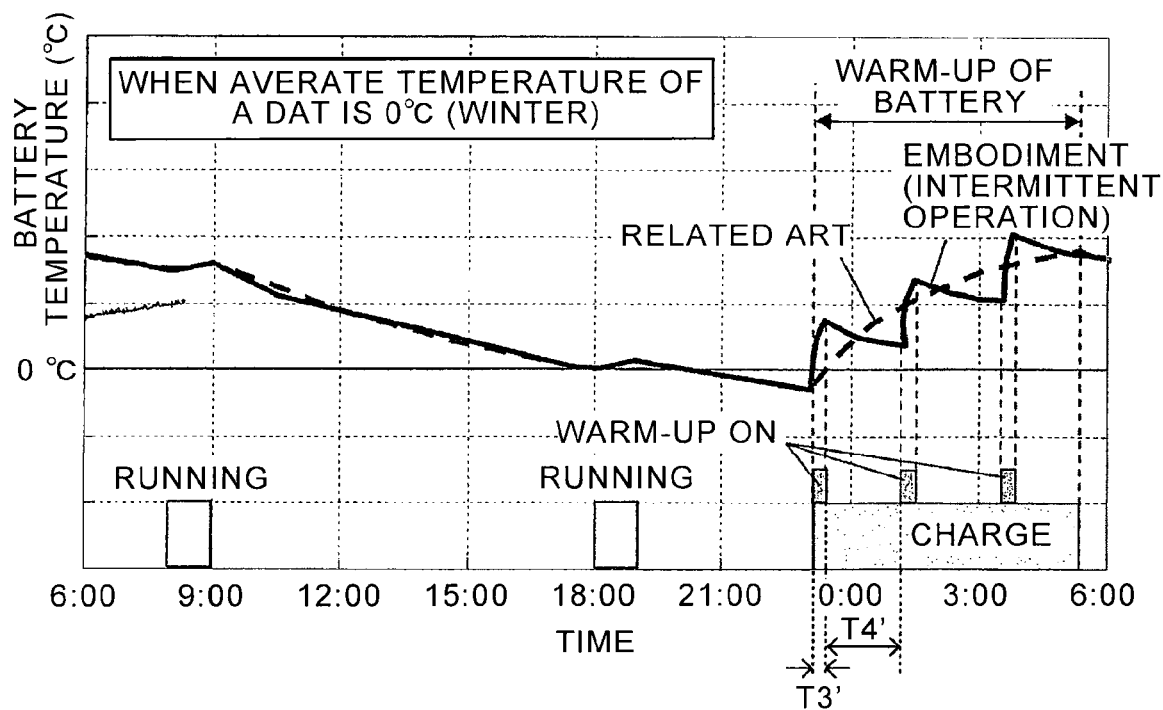
FIG. 8 is a graph indicating temperature changes during warming-up of the battery assembly.

FIG. 8 shows changes in the temperature of the battery assembly 10 which varies from hour to hour. In FIG. 8, the horizontal axis indicates time, and the vertical axis indicates the temperature of the battery assembly 10. The dotted line indicates changes in the temperature of the battery assembly 10 in the case where the temperature control system 100 is continuously operated during external charging. The solid line indicates changes in the temperature of the battery assembly 10 in the case where the temperature control system 100 is intermittently operated during external charging. In the example of FIG. 8, since the average temperature of a day is a relatively low temperature of 0° C., the process of elevating the temperature of the battery assembly 10 while externally charging the same was performed. Also, as a result of computation by the controller 20, the frequency of intermittent operation N1 [times] was calculated as three times. By comparing the solid line with the dotted line, it was found that the average temperature of the battery assembly 10 during external charging does not substantially differ between the case of continuous operation and the case of intermittent operation. In the case of intermittent operation, the temperature control system 100 is stopped at times corresponding to the intervals T4'. Therefore, the operating time of the compressor 54 is shortened, and the service life of the compressor 54 is less likely to be reduced, as compared with the case of continuous operation.

Referring to the flowchart of FIG. 7 again, the controller 20 calculates the SOC of the battery assembly 10 after starting external charging of the battery assembly 10 (step S129), and continues charging until the SOC of the battery assembly 10 reaches the target SOC (step S130).

If the available charge time (TC−T0) [sec] is shorter than the execution time (T3'+T4')N1' [sec] of intermittent operation (NO in step S127), the scheduled intermittent operation cannot be completed within the available charge time (TC−T0) [sec], resulting in insufficient warm-up of the battery assembly 10. Therefore, step S131 and subsequent steps are executed, so as to change the operation schedule. The controller 20 changes the frequency of intermittent operation N1' [times] to a new frequency of intermittent operation Nn' [times] which is smaller by one than that of the last cycle (step S131). For example, when the frequency of intermittent operation N1' [times] of the last cycle is three times, the controller 20 sets two times as the new frequency of intermittent operation Nn' [times].

After calculating the frequency of intermittent operation Nn' [times], the controller 20 divides the required charge time T1 [sec] by the frequency of intermittent operation Nn+ [times], so as to re-calculate a new interval Tn' [sec] (step S132). The controller 20 fixes the operation schedule, and stores it in the storage unit 40 (step S133). More specifically, the controller 20 determines an intermittent operation mode in which the operating state in which the temperature control system 100 is operated only for the minimum start-up time T3' [sec] and the stopped state in which the temperature control system 100 is stopped only for the interval Tn' [sec] are alternately repeated Nn' times, as the operation schedule.

The controller 20 compares the execution time (T3'+Tn') Nn' [sec] of intermittent operation determined in step S134, with the available charge time (TC−T0) [sec] (step S134). If the available charge time (TC−T0) [sec] is longer than the execution time (T3'+Tn')Nn' [sec] of intermittent operation (YES in step S134), the scheduled intermittent operation can be completed within the available charge time (TC−T0) [sec]. In this case, the controller 20 intermittently operates the temperature control system 100, according to the fixed operation schedule. If the available charge time (TC−T0) [sec] is not longer than the execution time (T3'+Tn')Nn' [sec] of intermittent operation (NO in step S134), the control returns to step S131. Then, step S131 through step S134 are repeatedly executed, until the available charge time (TC−T0) [sec] becomes longer than the execution time (T3'+Tn') Nn' [sec] of intermittent operation.

According to the above-described method, the amount of energy required to elevate the temperature of the battery assembly 10 is calculated, and the temperature of the battery assembly 10 can be elevated to an extent corresponding to this amount of energy within the available charge time (TC−T0) [sec]; therefore, the battery assembly 10 can be prevented from being insufficiently warmed up. Consequently, the input and output characteristics of the battery assembly 10 after external charging can be maintained at desired levels.

Modified Example 1

In the above-described embodiment, the user enters the charge finish time into the charge finish time receiving unit 30, for timer-controlled charging of the battery assembly 10. However, the invention is not limited to this arrangement, but may be applied to the case where the charging system does not have the timer-controlled charging function. In this case, step S102, step S103, and step S106 are eliminated from the flowchart of FIG. 4. Namely, after calculating the required charge time T1 in step S105, the controller 20 skips step S106, and executes step S107. In this case, temperature control of the battery assembly 10 is prioritized over external charging of the battery assembly 10, and is thus not omitted; therefore, reduction in the service life of the battery assembly 10 can be curbed, and the input and output characteristics of the battery assembly 10 can be maintained at high levels, with improved reliability.

The invention claimed is:

1. A temperature control system for a vehicle, comprising:
an on-vehicle battery configured to be charged using an external power supply located outside of the vehicle;
an on-vehicle air conditioner configured to control a temperature of a vehicle interior and a temperature of the on-vehicle battery; and
a controller configured to operate the on-vehicle air conditioner in an intermittent operation mode so as to control the temperature of the on-vehicle battery, when the on-vehicle battery is charged using the external power supply, wherein the controller intermittently operates the on-vehicle air conditioner so as to cool the on-vehicle battery,
wherein an equation (1) below is satisfied:

$$N1 = \{C \times (K0 - K1) \times A\} \div P \div T3 \tag{1}$$

where C is a heat capacity of the on-vehicle battery, K1 is a target cooling temperature of the on-vehicle batter, K0 is the temperature of the on-vehicle battery when cooling of the on-vehicle battery is started, A is a temperature control efficiency of the on-vehicle battery, P is a power of the on-vehicle air conditioner, T3 is a minimum start-up time of the on-vehicle air conditioner, and N1 is a frequency of intermittent operation of the on-vehicle air conditioner in the intermittent operation mode.

2. The temperature control system according to claim 1, wherein:
the intermittent operation mode is an operating mode in which an operating state and an operation stopped state are alternately repeated at the frequency of intermittent operation;
the operating state is a state in which the on-vehicle air conditioner is operated for the minimum start-up time; and
the operation stopped state is a state in which operation of the on-vehicle air conditioner is stopped for an interval obtained by dividing a required charge time required to charge the on-vehicle battery, by the frequency of intermittent operation.

3. The temperature control system according to claim 1, further comprising a charge finish time receiving unit configured to receive information related to a charge finish time, wherein:
the on-vehicle air conditioner is driven using electric power of the on-vehicle battery;
the controller is configured to operate the on-vehicle air conditioner in the intermittent operation mode when an available charge time is longer than a required charge time required to charge the on-vehicle battery, and not to operate the on-vehicle air conditioner in the intermittent operation mode when the available charge time is shorter than the required charge time; and
the available charge time is a difference between a current time at which the on-vehicle battery starts being charged using the external power supply, and the charge finish time received by the charge finish time receiving unit.

4. The temperature control system according to claim 2, further comprising a charge finish time receiving unit configured to receive information related to a charge finish time, wherein:
the controller is configured to intermittently operate the on-vehicle air conditioner when an available charge time is longer than an intermittent operation time calculated according to an equation (2) below, and intermittently operate the on-vehicle air conditioner at another frequency of intermittent operation which is smaller than the frequency of intermittent operation, when the available charge time is shorter than the intermittent operation time, $$(T3 + T4) \times N1 \tag{2}$$

where T4 is the interval obtained by dividing the required charge time by the frequency of intermittent operation; and
the available charge time is difference between a current time at which the on-vehicle battery starts being charged using the external power supply, and the charge finish time received by the charge finish time receiving unit.

5. A temperature control system for a vehicle, comprising:
an on-vehicle battery configured to be charged using an external power supply located outside of the vehicle;
an on-vehicle air conditioner configured to control a temperature of a vehicle interior and a temperature of the on-vehicle battery; and
a controller configured to operate the on-vehicle air conditioner in an intermittent operation mode so as to control the temperature of the on-vehicle battery, when the on-vehicle battery is charged using the external power supply,
wherein the controller intermittently operates the on-vehicle air conditioner so as to elevate the temperature of the on-vehicle battery,
wherein an equation (1)' below is satisfied:

$$N1' = \{C \times (K0' - K1') \times A\} \div P' \div T3' \tag{1'}$$

where C is a heat capacity of the on-vehicle battery, K1' is a target elevated temperature of the on-vehicle battery, K0' is the temperature of the on-vehicle battery when warm-up of the on-vehicle battery is started, A is a temperature control efficiency of the on-vehicle battery, P' is a power of the on-vehicle air conditioner, T3' is a minimum start-up time of the on-vehicle air conditioner, and N1' is a frequency of intermittent operation of the on-vehicle air conditioner in the intermittent operation mode.

6. The temperature control system according to claim 5, wherein:
the intermittent operation mode is an operating mode in which an operating state and an operation stopped state are alternately repeated at the frequency of intermittent operation;
the operating state is a state in which the on-vehicle air conditioner is operated for the minimum start-up time; and
the operation stopped state is a state in which operation of the on-vehicle air conditioner is stopped for an interval obtained by dividing a required charge time required to charge the on-vehicle battery, by the frequency of intermittent operation.

7. The temperature control system according to claim 5, further comprising a charge finish time receiving unit configured to receive information related to a charge finish time, wherein:
- the on-vehicle air conditioner is driven using electric power of the on-vehicle battery;
- the controller is configured to operate the on-vehicle air conditioner in the intermittent operation mode when an available charge time is longer than a required charge time required to charge the on-vehicle battery, and not to operate the on-vehicle air conditioner in the intermittent operation mode when the available charge time is shorter than the required charge time; and
- the available charge time is a difference between a current time at which the on-vehicle battery starts being charged using the external power supply, and the charge finish time received by the charge finish time receiving unit.

8. The temperature control system according to claim 6, further comprising a charge finish time receiving unit configured to receive information related to a charge finish time, wherein:

- the controller is configured to intermittently operate the on-vehicle air conditioner when an available charge time is longer than an intermittent operation time calculated according to an equation (2)' below, and intermittently operate the on-vehicle air conditioner at another frequency of intermittent operation which is smaller than the frequency of intermittent operation, when the available charge time is shorter than the intermittent operation time, $$(T3'+T4') \times N1' \qquad (2)'$$

- where T4' is the interval obtained by dividing the required charge time by the frequency of intermittent operation; and
- the available charge time is a difference between a current time at which the on-vehicle battery starts being charged using the external power supply, and the charge finish time received by the charge finish time receiving unit.

\* \* \* \* \*